3,256,144
SILYLACETYLENE BACTERICIDES AND FUNGICIDES

Robert L. Merker, Pittsburgh, Pa., assignor to Dow Corning Corporation, Midland, Mich., a corporation of Michigan
No Drawing. Filed June 28, 1963, Ser. No. 291,301
12 Claims. (Cl. 167—22)

This invention relates to the use of 1-hexynyltrimethylsilane and phenylethynyltrimethylsilane as bactericides and fungicides.

More specifically, this invention relates to a process for inhibiting the growth of *Staphylococcus aureus* or *Trichophyton mentagrophytes* which comprises contacting the above bacterium or fungus with 1-hexynyltrimethylsilane or phenylethynyltrimethylsilane or with a composition comprising them. Phenylethynyltrimethylsilane or a composition comprising it can also be used to inhibit the growth of the fungus Hormodendrum sp.

This invention also relates to a jet fuel containing a fungicidal amount of phenylethynyltrimethylsilane. Preferably the fuel should contain from 0.05 to 2 percent by weight of the silane.

This invention further relates to a process for inhibiting the formation of sludge in jet fuels caused by the fungus Hormodendrum sp., which comprises incorporating therein a fungicidal amount, preferably from 0.05 to 2 percent by weight, of phenylethynyltrimethylsilane.

Phenylethynyltrimethylsilane, $C_6H_5C{\equiv}CSi(CH_3)_3$, and 1-hexynyltrimethylsilane, $CH_3(CH_2)_3C{\equiv}CSi(CH_3)_3$, are known compounds and can be prepared, for example, by the process disclosed in U.S. Patent 2,671,795. Both of these compounds are liquids.

The compounds of this invention can be used per se as bactericides and fungicides or, as is customary in the art, they can be used in admixture with conventional adjuvants and carriers which are not detrimental to their activity.

In order that those skilled in the art can better understand how the present invention can be practiced, the following examples are given by way of illustration and not by way of limitation.

Example 1

Nutrient agar plates were inoculated by streaking with 16 hour broth cultures of staphylococcus aureus. Absorbent paper discs 12.7 mm. in diameter were dipped into the 1-hexynyltrimethylsilane or phenylethynyltrimethylsilane, allowed to drain, and then placed on the inoculated agar plates. Three separate tests of each compound were made. The plates containing the bacteria were incubated at 37° C. for 24 hours. At the end of the incubation period, the zones of inhibition were observed and were recorded on a zero (0) to four-plus (++++) basis, as follows:

0=no inhibition of growth;
+=poor inhibition of growth;
++=fair inhibition of growth;
+++=good inhibition of growth; and
++++=excellent inhibition of growth.

The size of the zones without microbial growth indicated the degree of antimicrobic activity (the larger the zone, the greater the activity).

The results of the tests, which are the average of three separate tests, were as follows:

1-hexynyltrimethylsilane—++++
Phenylethynyltrimethylsilane—+++.

Example 2

Sabouraud's dextrose agar plates were inoculated with 5 day broth cultures of *Trichophyton mentagrophytes*. Absorbent paper discs 12.7 mm. in diameter were dipped into the 1-hexynyltrimethylsilane or phenylethynyltrimethylsilane, allowed to drain, and then placed on the inoculated agar plates. Three separate tests of each compound were made. The plates containing the fungi were incubated at 23° C. for 5 days. At the end of the incubation period, the zones of inhibition were observed and recorded on a zero to four-plus basis as in Example 1 above.

The results of the tests, which are the average of three separate tests, were as follows:

1-hexynyltrimethylsilane—++++
Phenylethynyltrimethylsilane—++++.

Example 3

Sabouraud's dextrose agar plates were inoculated with 5 day broth cultures of Hormodendrum sp., a fungus responsible, in part, for the formation of sludge in fuels for jet aircraft. Absorbent paper discs 12.7 mm. in diameter were dipped into the phenylethynyltrimethylsilane and then placed on the inoculated agar plates. Three separate tests of the compound were made. The plates containing the fungi were incubated at 23° C. for 5 days. At the end of the incubation period, the zones of inhibition were observed and recorded on a zero to four-plus basis as in Example 1 above.

The results of the tests, which are the average of three separate tests, were +++.

Example 4

When 0.05, 0.1, 0.5, 1 or 2 percent by weight of phenylethynyltrimethylsilane is incorporated into jet fuels it inhibits the formation of sludge caused by the fungus Hormodendrum sp.

That which is claimed is:

1. A process for inhibiting the growth of *Staphylococcus aureus* which comprises contacting said *Staphylococcus aureus* with a composition comprising 1-hexynyltrimethylsilane.

2. A process for inhibiting the growth of *Staphylococcus aureus* which comprises contacting said *Staphylococcus aureus* with 1-hexynyltrimethylsilane.

3. A process for inhibiting the growth of *Staphylococcus aureus* which comprises contacting said *Staphylococcus aureus* with a composition comprising phenylethynyltrimethylsilane.

4. A process for inhibiting the growth of *Staphylococcus aureus* which comprises contacting said *Staphylococcus aureus* with phenylethynyltrimethylsilane.

5. A process for inhibiting the growth of *Trichophyton mentagrophytes* which comprises contacting said *Trichophyton mentagrophytes* with a composition comprising 1-hexynyltrimethylsilane.

6. A process for inhibiting the growth of *Trichopyton mentagrophytes* which comprises contacting said *Trichophyton mentagrophytes* with 1-hexynyltrimethylsilane.

7. A process for inhibiting the growth of *Trichophyton mentagrophytes* which comprises contacting said *Trichophyton mentagrophytes* with a composition comprising phenylethynyltrimethylsilane.

8. A process for inhibiting the growth of *Trichophyton mentagrophytes* which comprises contacting said *Trichophyton mentagrophytes* with phenylethynyltrimethylsilane.

9. A process for inhibiting the growth of Hormodendrum sp. which comprises contacting said Hormodendrum sp. with a composition comprising phenylethynyltrimethylsilane.

10. A process for inhibiting the growth of Hormodendrum sp. which comprises contacting said Hormodendrum sp. with phenylethynyltrimethylsilane.

11. Jet fuel containing a fungicidal amount of phenylethynyltrimethylsilane.

12. Jet fuel containing from 0.05 to 2 percent by weight of phenylethynyltrimethylsilane.

References Cited by the Examiner

UNITED STATES PATENTS

| 2,887,371 | 5/1959 | Bennett et al. | 260—448.2 |
| 2,975,042 | 3/1961 | Summers | 44—72 |
| 2,975,043 | 3/1961 | Ambrose | 44—72 |

DANIEL E. WYMAN, *Primary Examiner.*

Y. M. HARRIS, *Assistant Examiner.*